United States Patent [19]
Wynn et al.

[11] Patent Number: 5,430,380
[45] Date of Patent: Jul. 4, 1995

[54] SENSOR FOR LOCATING OBJECTS IN THE SEA HAVING A CONDUCTIVE SHELL TO INJECT ELECTRIC CURRENT INTO THE SEA AND A SENSOR COIL IN THE SHELL

[75] Inventors: William M. Wynn; John T. Bono, both of Panama City, Fla.

[73] Assignee: The United States of America as represented by the Secretary of the Navy, Washington, D.C.

[21] Appl. No.: 23,431

[22] Filed: Feb. 26, 1993

[51] Int. Cl.$^6$ .......................... G01V 3/02; G01V 3/04; G01V 3/06; G01V 3/08

[52] U.S. Cl. ................................... 324/365; 324/359; 324/326

[58] Field of Search ............... 324/326, 327, 328, 329, 324/359, 365

[56] References Cited

U.S. PATENT DOCUMENTS

| | | | |
|---|---|---|---|
| 2,066,561 | 5/1937 | Fisher | 324/329 |
| 2,744,232 | 5/1956 | Shawhan et al. | 324/329 |
| 3,329,929 | 7/1967 | Burnett | 324/365 |

OTHER PUBLICATIONS

Wynn et al. "A New Sensor Concept ..." Naval Surface Wepons Warfare Center Publication CSS Tr435-91 Mar. 92 pp. 23-33.

*Primary Examiner*—Walter E. Snow
*Attorney, Agent, or Firm*—Kenneth W. Dobyns; W. C. Townsend; Edward J. Connors

[57] ABSTRACT

A sensor for sensing the location of objects buried in the loose sediment in the bed of the sea. A hollow, cylindrically symmetric, conductive shell is used to inject current into seawater at its tips along its axis. A sensor coil oriented along the axis ignores all magnetic fields except those along the axis, and is used to measure return signals. This is particularly useful in detecting dielectric objects buried in the sediment and in rejecting motion relative to the seabed.

5 Claims, 5 Drawing Sheets

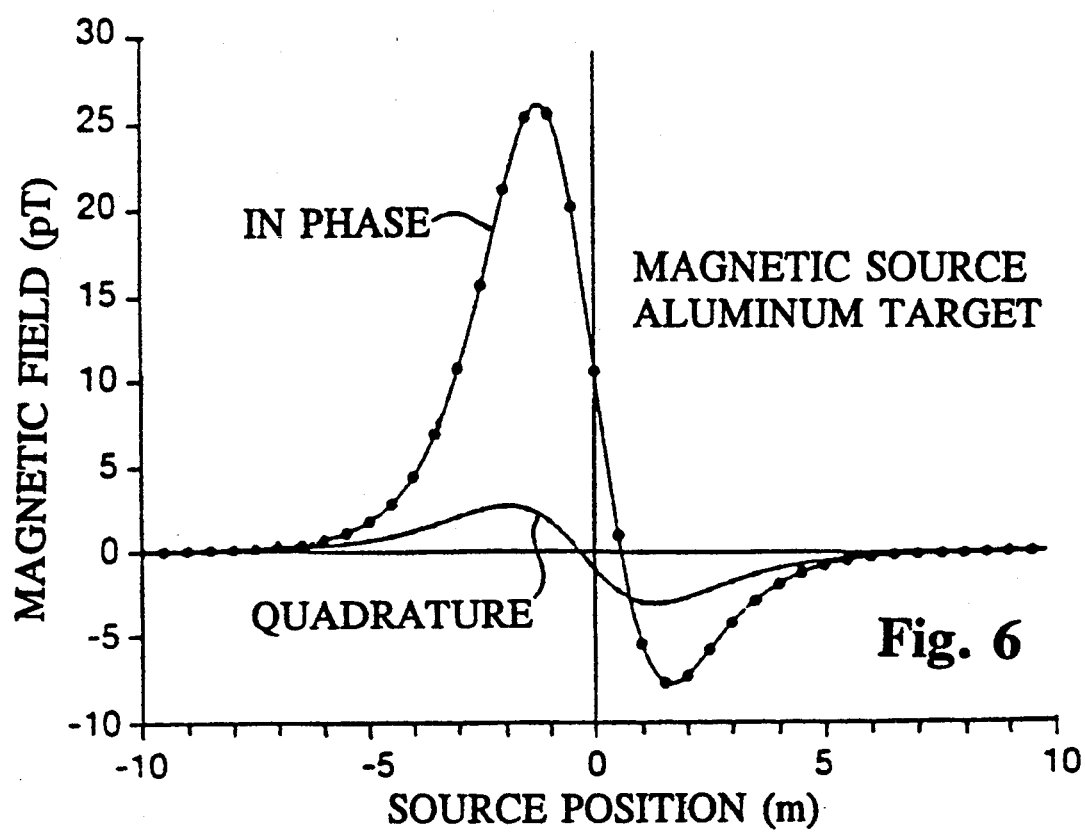
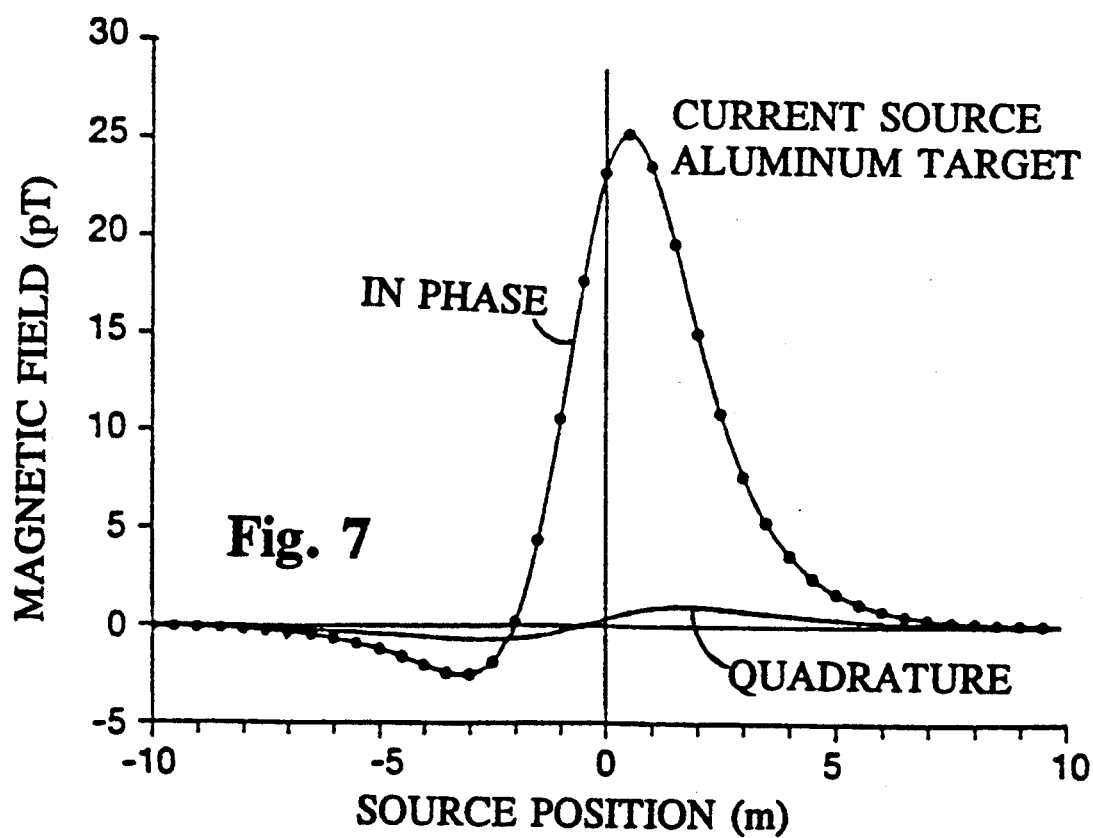

SENSOR FOR LOCATING OBJECTS IN THE SEA HAVING A CONDUCTIVE SHELL TO INJECT ELECTRIC CURRENT INTO THE SEA AND A SENSOR COIL IN THE SHELL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to a sensor for sensing the location of objects buried in the loose sediment in the bed of the sea or other body of water, which loose sediment is called soil hereinafter.

Finding and identifying sea-bottom objects is a difficult problem, especially if the objects are partially or completely buried in the soil at the bottom of the sea. Long-range techniques using optics or sonar work in some cases, but optical techniques break down in turbid water, and optics and sonar are ineffective against buried objects. A long-range technique such as radar is useless in seawater, because seawater's high electrical conductivity causes excessive absorption of the field. However, a low-frequency electromagnetic field is sufficiently unattenuated in seawater that it offers some detection capability at limited ranges.

The classical techniques such as radar and sonar are appealing, because they allow the field of the source to be separated from the object's return field by convenient methods such as range gating to provide time separation. Optical techniques lend themselves to imaging. However, low-frequency electromagnetic techniques in seawater present formidable source-field-/return-field separation problems. If an object to be detected is made of ferromagnetic material (iron or steel), the object will distort the ambient earth's magnetic field, and will be detectable at some range, depending on the object's size, by means of passive magnetic sensors. Aside from the problem of sensor sensitivity, the problem of moving the sensor about in the large ambient magnetic field of the earth precludes the use of vector magnetometers—they cannot be stabilized adequately, and therefore noise due to motion in the earth's magnetic field will obscure the anomalous signal. Two approaches which are currently under investigation use total field magnetometers, or carefully balanced tensor gradiometers which are relatively insensitive to the highly uniform earth's magnetic field. For sea-bottom buried objects composed of nonferromagnetic materials, low-frequency active electromagnetics appear to offer the only viable detection technique.

For active electromagnetic detection in seawater, the frequency typically is limited to the audio range. There are two principal reasons for this: (1) at 10 Khz the skin depth in seawater is approximately 2.5 meters, dropping to less than a meter at 100 kHz, and (2) for maximum sensitivity in a small volume, the sensor of choice is an induction magnetometer having a permeable core, and eddy current losses in the core become important as frequency increases.

In the audio frequency range, the displacement current in seawater is negligible compared to the conduction current, and the quasi-static approximation holds. Thus, the field equations are diffusive in character, and it is not possible to separate source field and return field by range gating in the conventional sense. If the detected object has high electrical conductivity, it is possible to use a pulsed magnetic coil source. Then, the current induced in the object has a smaller decay constant than that induced in the seawater volume, and the detected field shows a change in slope with time which, in principle, can be exploited for detection. However, the usefulness of this approach in the detection of small localized objects, as opposed to characterizing vertically layered conducting strata, is not at all established, and constitutes a separate research issue. In the work leading to the present invention, we have investigated active electromagnetic detection with a time-harmonic continuous-wave (CW) source.

The conventional low-frequency active electromagnetic detector consists of a driven coil carrying a stable, time-harmonic circuit, and a sensor coil which is made insensitive to the drive coil field by means of relative geometry, and electronic compensation techniques. Examples of compensation techniques include: (1) the use of relatively insensitive, intermediately positioned reference coils whose outputs are used to cancel the drive coil signal at the sensor coil by means of feedback, and (2) direct feedback of the drive coil signal to the sensor coil with rejection of a very narrow range of frequencies about the driven coil frequency. The latter technique requires relative motion between the detector and object in order to produce sufficient signal bandwidth for detection, and commonly is used in proximity fuzes. The driven-coil/sensor-coil arrangement has a number of features which limit its performance as a detector of sea-bottom buried objects.

The magnitude of the source magnetic field at the sensor coil is very large compared to the field due to the detected object. For this reason, the ability to reject the source magnetic field, not the sensor sensitivity, limits the performance of the detector.

The magnetic field of the driven coil induces magnetization in a permeable object and eddy currents in an electrically conducting object. Apart from attenuation and boundary effects, the source magnetic field obeys an inverse-cube power law in range. The object, in turn, develops an induced magnetic dipole moment, and the anomalous magnetic field also obeys an inverse-cube power law in range, giving a detection system whose sensitivity varies nominally as the inverse-sixth power of the separation distance between detector and object. This severely limits the range of the detector.

The driven coil magnetic field induces eddy currents directly in seawater, and these currents can interact weakly with the conductivity contrast presented by an object. The secondary magnetic fields produced by this process are small compared to those produced by the processes described above, and this type of detector is not very effective against non-conducting objects in seawater.

The presence of the seawater eddy currents will cause secondary fields to be seen in the sensor coil when the detector is near the sea bottom. This will cause the detector to be sensitive to its position and/or orientation relative to the sea bottom. This may be seen by visualizing orthogonal driven coils and sensor coil arrangements and the geometry of the sea-bottom image fields of the driven coil. The only configuration which does not see the bottom is one in which the sensor coil is on the driven-coil axis with its sense axis orthogonal, and both axes are parallel to the bottom. Even this combination will respond to the bottom if there is roll about the driven-coil axis.

SUMMARY OF THE INVENTION

Rather than use a driven coil to create a primary magnetic field to interact with sea-bottom objects, the present invention uses a harmonically-driven current which is injected directly into the seawater. This type of source produces both a robust distributed current, and a substantial source magnetic field. The magnetic field interacts with the object via (1) induced magnetization and eddy currents, as in the case of the magnetic coil source, and (2) the strong volume current intereacts with the conductivity contrast. Detection is then accomplished via a magnetic coil sensor which detects the combined magnetic field of the associated induced magnetic and current dipoles. Since the magnetic field of a current dipole nominally has an inverse-square power law in range, the detector performance via either mechanism, apart from boundary and attenuation effects, is inverse fifth-power in the detector-object separation distance. Of course, the issue immediately arises as to the strength of the primary-current/conductivity-contrast interaction when the object is buried in the sea bottom, whose conductivity may be an order-of-magnitude less than that of seawater. This issue is addressed in this specification below.

BRIEF DESCRIPTION OF THE DRAWINGS

FIG. 6 illustrates curves depicting the in-phase and quadrature detected signals using the hypothetical prior-art instrument in connection with a spherical aluminum target.

FIG. 7 illustrates curves depicting the in-phase and quadrature detected signals using the instrument of the present invention in connection with a spherical aluminum target.

DESCRIPTION OF THE INVENTION

Figure 1:
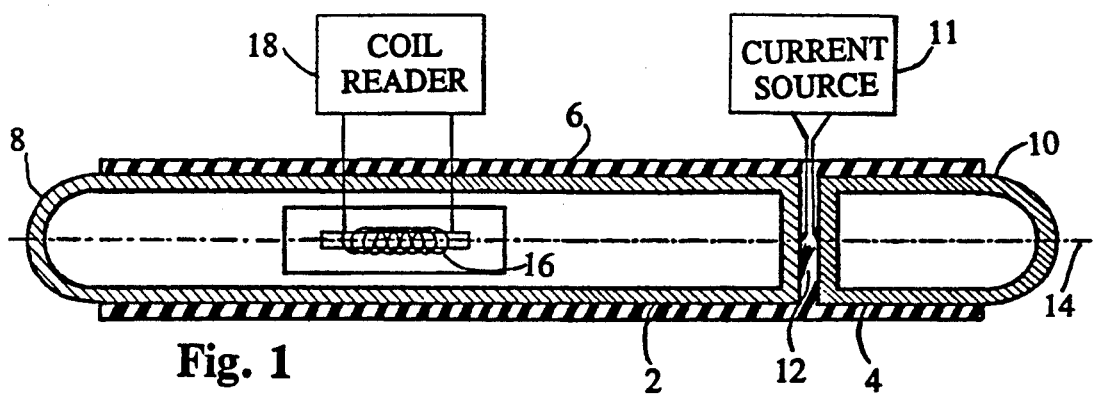
FIG. 1 is a cross-sectional schematic diagram of an instrument according to the present invention.

Referring to FIG. 1, our new sensor system has a current source in the form of a hollow, cylindrically symmetric shell 2 and 4 of electrically conducting material. The shell is partially covered by an insulating sleeve 6 on its exterior surface, such that only the ends 8 and 10 are electrically connected to the seawater. Another insulator 12 arranged perpendicular to the axis of symmetry 14 separates the shell into its fore section 4 and its aft section 2. Current from a current source 11 is applied at a point on the axis of symmetry at this separating insulator 12, such that a first current from one terminal of the current source leaves the forward exposed face 8 of the forward shell section 2 and enters the seawater, returning as a second opposing current through the after face 10 of the aft section 4 and returning to an opposing terminal of the current source 11 to complete the circuit.

For a cylindrically symmetric detector, the current in the shell and seawater has only radial and axial components, and these are distributed with cylindrical symmetry about the shell axis. For this case, the magnetic field is identically zero everywhere in the interior of the shell. Thus, a sensor placed within the shell will, in principle, see no source-generated magnetic field in any direction, and the source rejection problem is nonexistent. In a real system which approximates this symmetry, the source-generated magnetic field at the sensor is small, and is easily rejected, if it is stable.

The preferred detector configuration is one in which a sensor coil 16 is on the shell axis 14, and, when a coil reader 18 reads the current generated in the sensor coil, only the magnetic field component along the axis is measured. For this configuration, the axial magnetic field still vanishes if the symmetry requirements are relaxed to "all current filaments are symmetrically distributed with respect to a plane containing the detector axis." This leads to some valuable detector features, where the source strength is held constant.

(1) If the detector assembly is cylindrically symmetric, it does not respond to an arbitrary rotation or vertical translation relative to a conductivity structure which varies only vertically. In particular, this means that motions relative to a vertically stratified sea bottom are not seen.

(2) If the detector is cylindrically symmetric, it does not respond to a spherical free-field target. This means that it will be relatively immune to localized seawater column inhomogeneities.

(3) In spite of the immunity of the detector to the sea bottom alone, and to a free-field sphere alone, it robustly responds to a sphere in the vicinity of the sea bottom.

(4) The detector assembly can be deployed by means of a rigid strut below a larger body, so long as symmetry about a vertical plane containing the detector axis is maintained.

The result in (3) above is that a solution to a boundary-value problem cannot be obtained from the superposition of solutions to other boundary-value problems, however intuitively appealing that might seem. The result in (4) above is very important in the practical testing and deployment of the detector.

Figure 2:
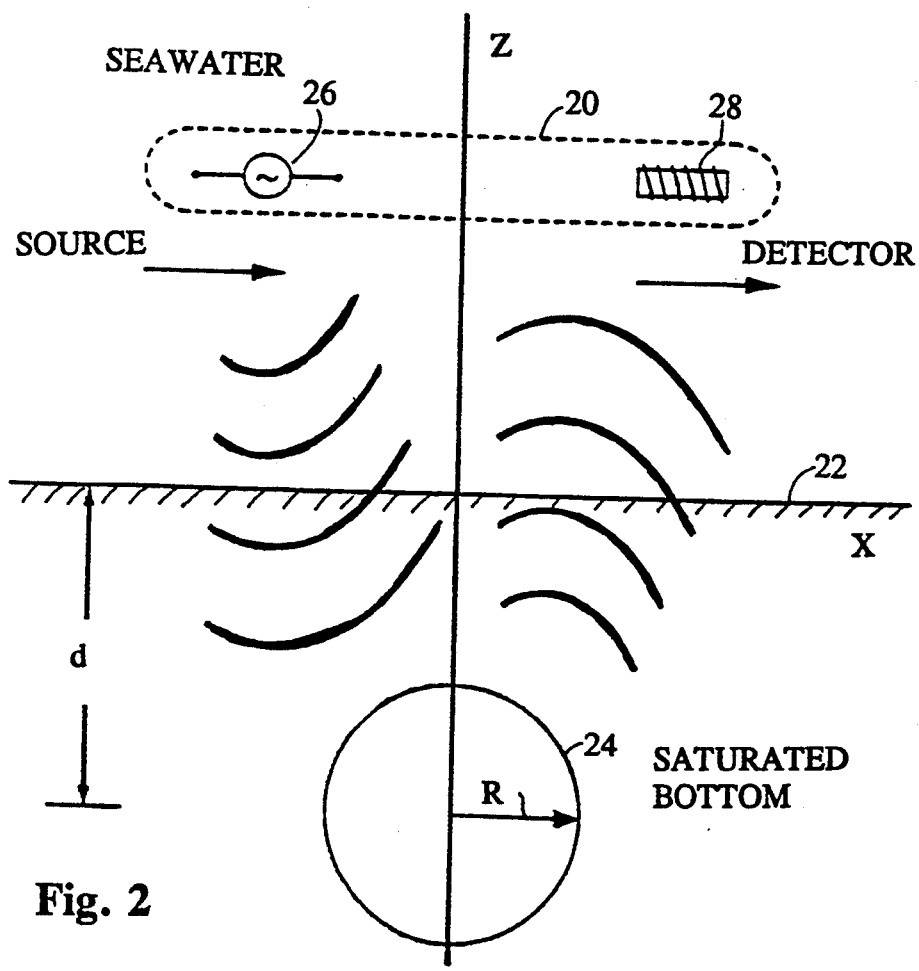
FIG. 2 is a diagramatic representation of the instrument according to the present invention in use.
Figure 5:
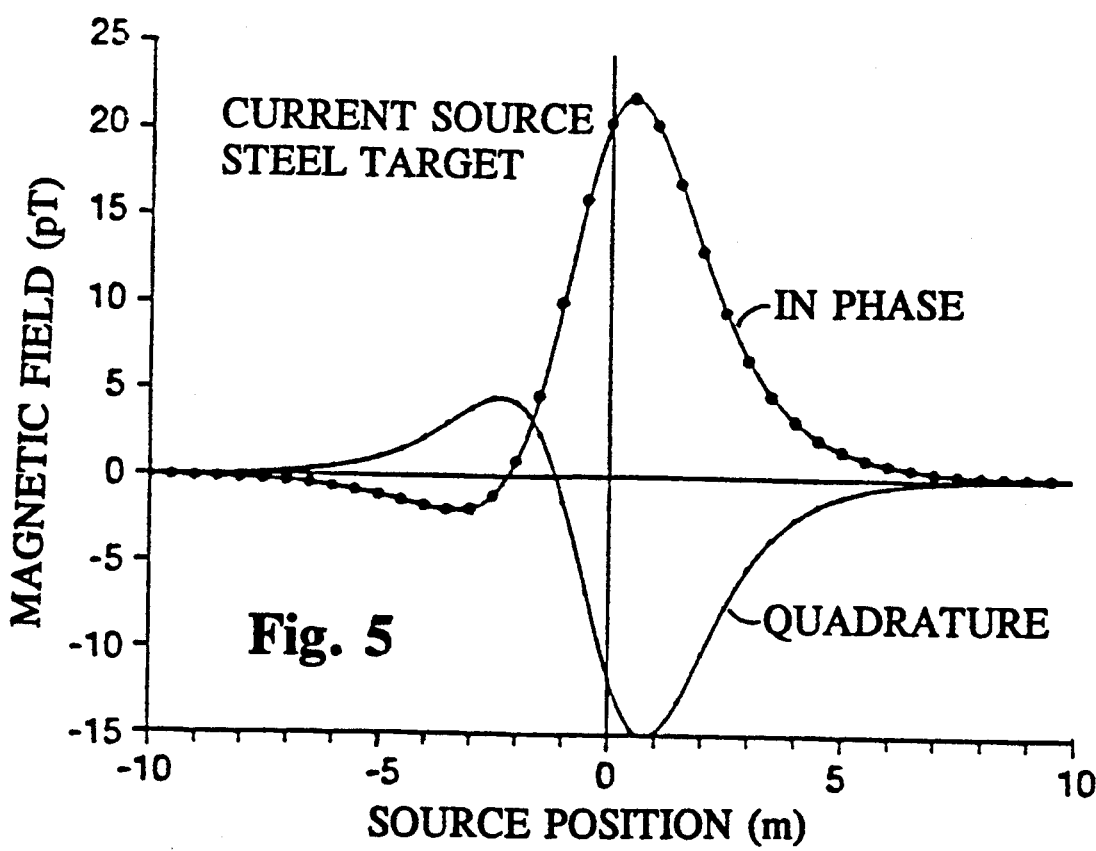
FIG. 5 illustrates curves depicting the in-phase and quadrature detected signals using the instrument of the present invention in connection with a spherical steel target.

FIG. 2 is a schematic view of the instrument of FIG. 1 in use. The instrument 20 is moved through seawater over the seabed 22. Buried in the seabed at a depth d is an object 24 which it is desired to detect. For ease of calculation, the object 24 is assumed to be a sphere of radius R. Calculations have been made for a uniform set of conditions in which the current source 26 and the detector 28 are separated by a distance of 0.5 meter, and the axis of the instrument is pulled through the water in the direction of the arrows at a distance of 1.0 meter from the seabed. The sphere has a radius of 0.5 meter and its center is 1.0 meter below the seabed. The current source has a strength of 10.0 ampere-meter. The movement of the instrument is along its axis, which is displaced laterally a distance of 3.0 meters from the buried sphere. The frequency of the current source is 1 KHz, and the seawater and sea-bottom conductivities are respectfully 4.0 and 0.4 siemans/meter. Calculations have been done for target spheres of steel (conducting and magnetic), aluminum (conducting and non-magnetic), and dielectric material (non-conducting and non-magnetic). It is clear that in every case, the peak magnetic field is large compared to the nominal RMS noise level of 0.06 picotesla. The curves for the calculations for a current source with steel, aluminum, and dielectric targets are respectively shown in FIGS. 5. 7 and 9.

Figure 3:
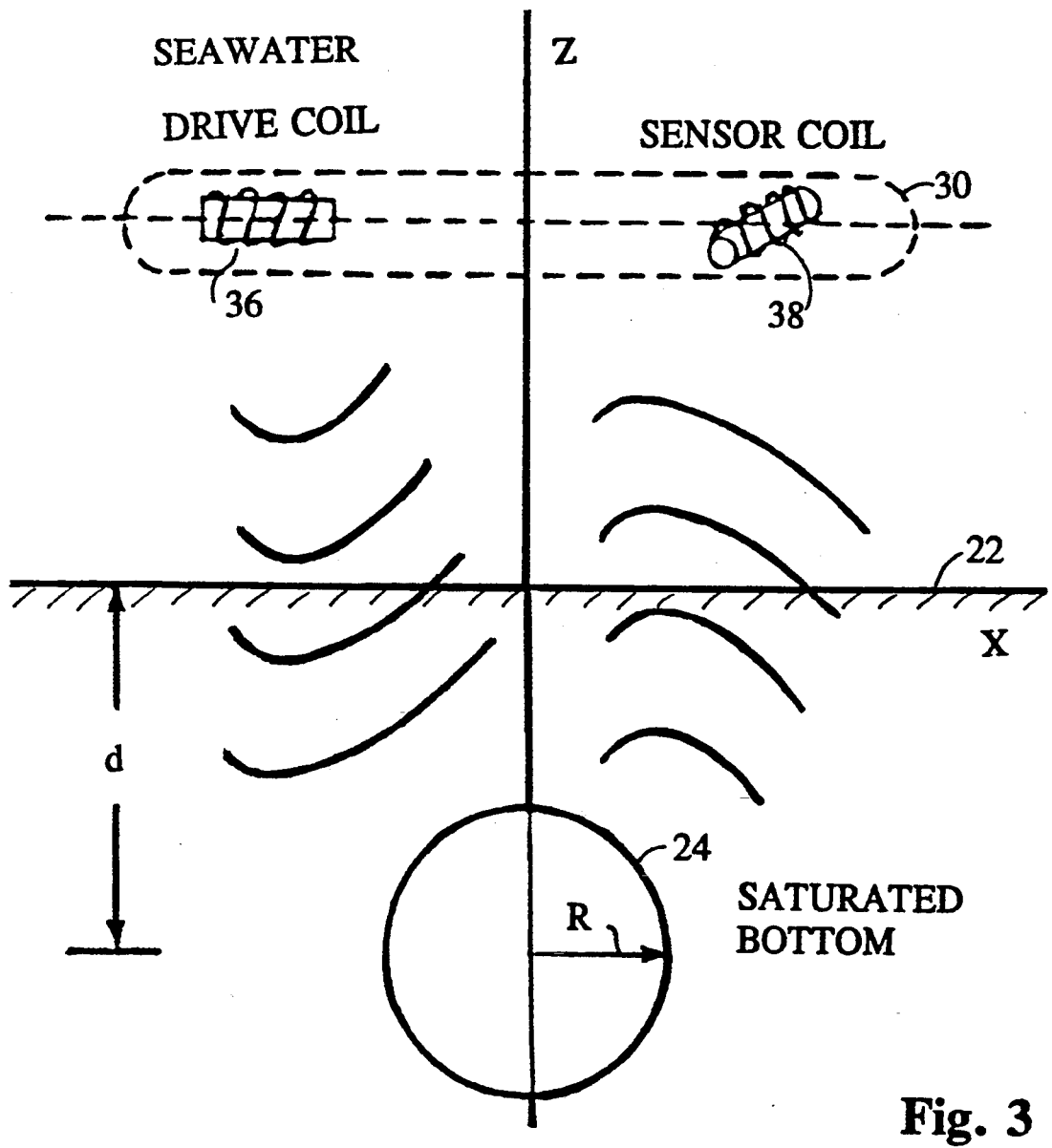
FIG. 3 is a diagramatic representation of a hypothetical prior art instrument in use.
Figure 4:
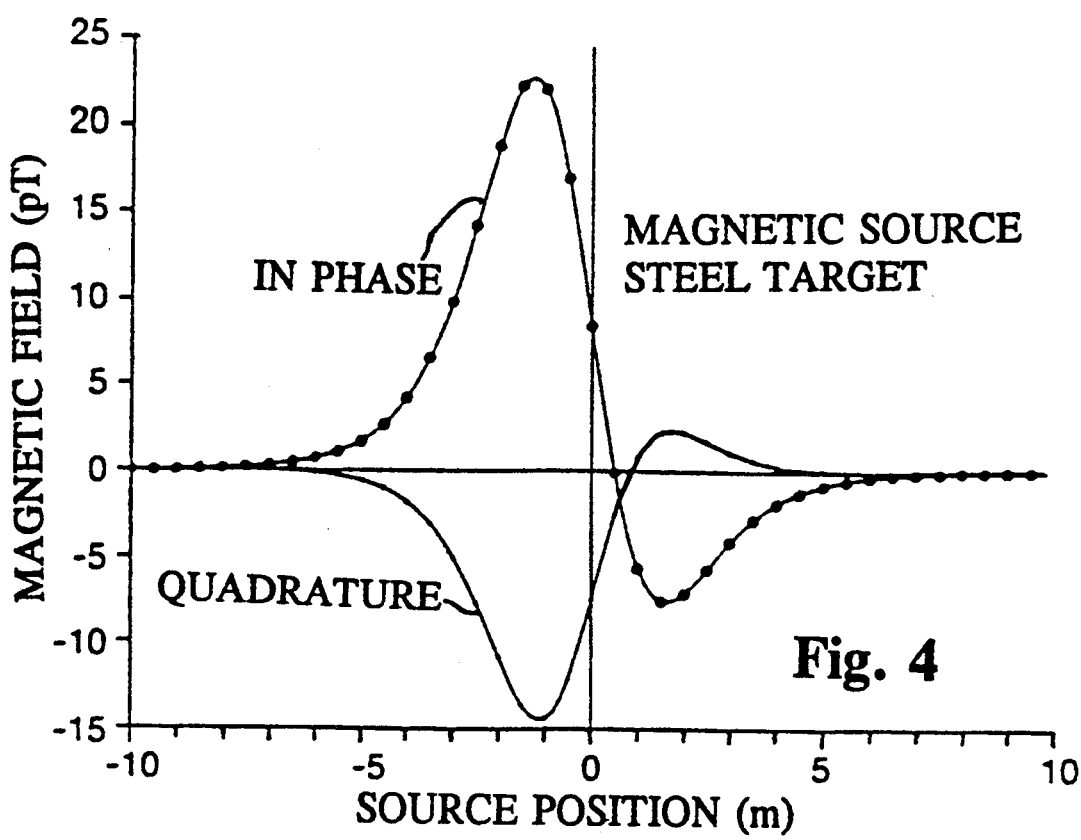
FIG. 4 illustrates curves depicting the in-phase and quadrature detected signals using the hypothetical prior-art instrument in connection with a spherical steel target.
Figure 8:
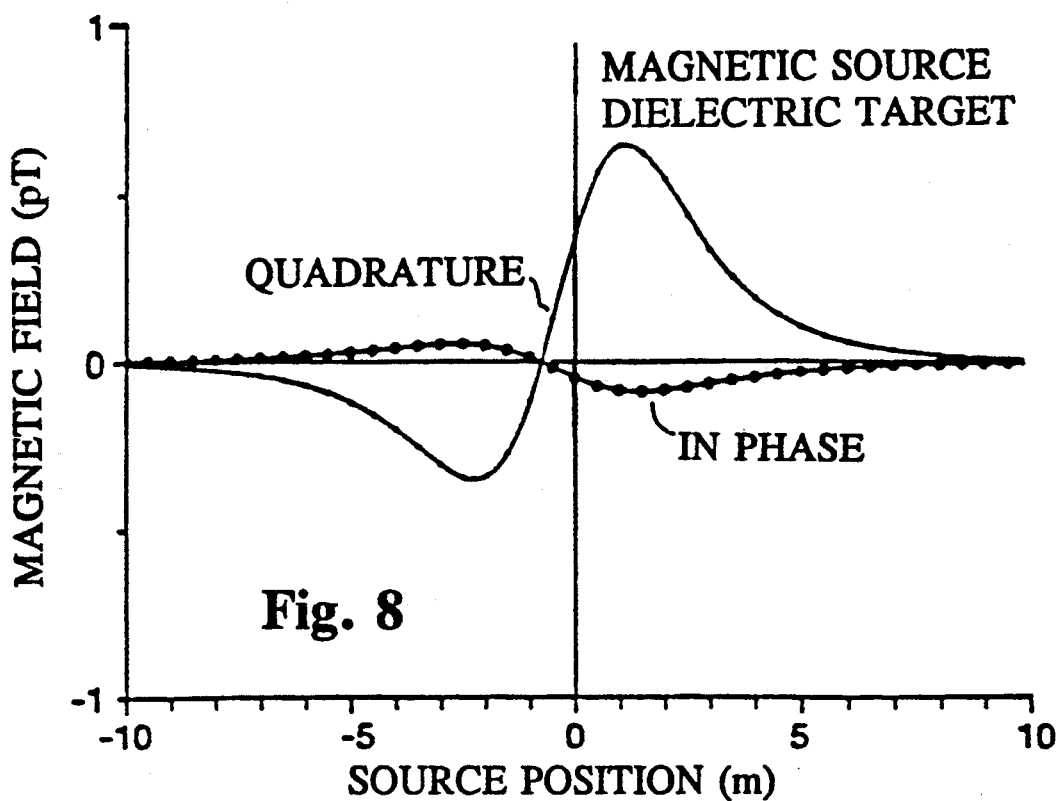
FIG. 8 illustrates curves depicting the in-phase and quadrature detected signals using the hypothetical prior-art instrument in connection with a spherical dielectric target.
Figure 9:
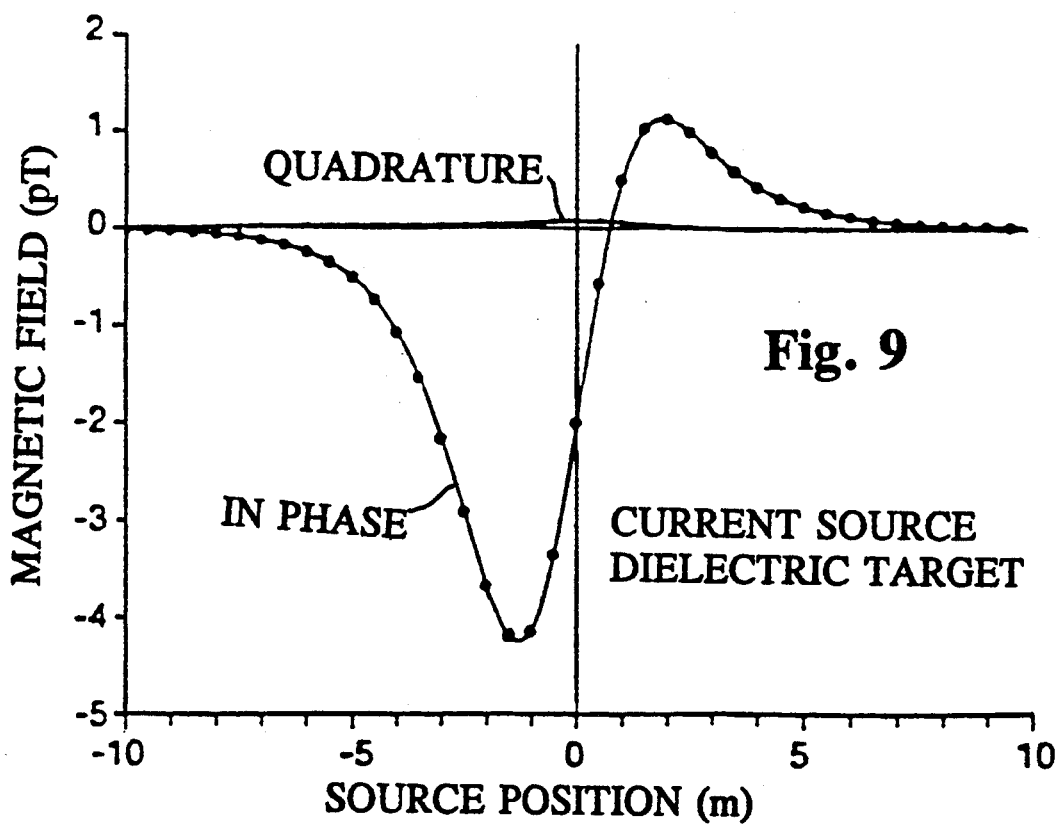
FIG. 9 illustrates curves depicting the in-phase and quadrature detected signals using the instrument of the present invention in connection with a spherical dielectric target.

For purposes of comparison, similar calculations were done for the most likely hypothetical magnetic-coil detector, as illustrated in FIG. 3. An instrument 30 is drawn through the water above the same seabed 22 in which the same spherical object 24 is buried. A drive coil 36 furnishes a magnetic field oriented along the instrument axis, which is also the direction of motion. A sensor coil 38 is centered on this axis with its sense axis horizontal and perpendicular to the drive coil axis. The drive coil has a moment of 10.0 ampere-meter squared, and all other parameters are the same. The results of the calculations for a magnetic source with steel, aluminum and dielectric targets are respectively shown in FIGS. 4, 6 and 8.

These curves show that the detected signals for the aluminum and steel spheres using the magnetic source are comparable in size to those with the current source, but the signals for the dielectric sphere are down by an order of magnitude.

This shows that the new detector has a raw performance as good as, or exceeding that of the conventional active detector, against sea-bottom targets of all compositions. It lacks the source rejection limitation and bottom sensitivity associated with the more conventional approach. It also has greater capability of detecting conductive targets which have been buried long enough to acquire an outer layer or concretion of non-conductive material.

We claim:

1. A sensor for use within an electrically conductive fluid to detect the presence of magnetizable, electrically conductive or electrically non-conductive objects in the vicinity of the sensor, comprising,
    A. First and second electrical conductors, situated on opposite sides of an insulative gap and extending in opposite directions along a line of axial symmetry, each of said conductors being constructed and arranged to be fully symmetrical about the line of axial symmetry, and at least one of the conductors forming a fully axially symmetrical hollow space therein,
    B. Means to apply first and second opposing alternating current to said conductors respectively at opposite sides of said insulative gap at the line of axial symmetry,
    C. Electrically insulative material axially symmetrically surrounding the first and second conductors and electrically arranged to insulate from the conductive fluid all parts of the conductors except for a respective tip end of each conductor which is most distant from the insulative gap, and
    D. A magnetic search coil axially symmetrically so arranged within the hollow space in a conductor that it is responsive only to magnetic fields along the axis of symmetry,
    whereby, the symmetry of the sensor in the conductive fluid causes the only substantial magnetic fields at the search coil along said axis to be due to magnetizable, electrically conductive or electrically non-conductive objects in the vicinity of the sensor, which thereby disturb the otherwise symmetrical magnetic field and flow of current from the tip end of one conductor to the tip end of the other conductor.

2. A sensor for use in water to detect magnetizable, electrically conductive or electrically non-conductive objects near the sensor, comprising,
    A. First and second electrical conductors, situated on opposite sides of an insulative gap and extending in opposite directions along a line of axial symmetry, each conductor being constructed and arranged to be symmetrical about the line, and at least one of the conductors forming a symmetrical hollow space therein,
    B. An alternating current source applied between said conductors at opposite sides of said insulative gap at the line,
    C. Electrical insulation to insulate from the water all parts of the conductors except for an end of each conductor away from the gap, and
    D. A magnetic sensing element so arranged within the hollow space to respond to magnetic fields along the line.

3. A sensor arranged about an axis for use in an electrically conductive fluid to detect magnetizable, electrically conductive or electrically non-conductive objects near the sensor, comprising,
    A. Means for injecting an alternating electric current into the electrically conductive fluid to create an alternating electric field in the fluid while also creating an alternating magnetic field resulting from the electric current, both alternating fields being symmetric about said axis in the absence of magnetizable, electrically conductive, or electrically non-conductive objects in the vicinity of the sensor, and
    B. A magnetic sensing element arranged on said axis within the sensor to respond to magnetic fields along the axis,
    whereby, the symmetry of the sensor in the conductive fluid causes the only substantial magnetic fields at the sensing element along said axis to be due to magnetizable, electrically conductive or electrically non-conductive objects in the vicinity of the sensor, which thereby disturb the otherwise symmetric alternating magnetic and electric fields and thus affect the magnetic sensing element.

4. A sensor in accordance with claim 3 which responds to electrically non-conductive objects in the vicinity of the sensor by sensing the change in the magnetic fields along the axis caused by the disturbance of the symmetry of the electric field generated by the sensor.

5. A sensor in accordance with claim 3 which responds to both electrically conductive and magnetizable objects in the vicinity of the sensor by sensing the magnetic fields generated in the objects by the electrical and magnetic fields generated directly by the sensor.

* * * * *